United States Patent [19]
Phillips

[11] Patent Number: 5,702,738
[45] Date of Patent: Dec. 30, 1997

[54] SURFACE-RIPENED CHEESE PRODUCT

[75] Inventor: Michael John Phillips, Port Melbourne, Australia

[73] Assignee: Kraft Foods Limited, Port Melbourne, Australia

[21] Appl. No.: 927,515

[22] PCT Filed: Mar. 19, 1991

[86] PCT No.: PCT/AU91/00094

§ 371 Date: Nov. 7, 1992

§ 102(e) Date: Nov. 7, 1992

[87] PCT Pub. No.: WO91/14374

PCT Pub. Date: Oct. 3, 1991

[51] Int. Cl.⁶ .................................. A23C 9/12
[52] U.S. Cl. .................. 426/36; 426/34; 426/42; 426/580; 426/582
[58] Field of Search ..................... 426/36, 42, 34, 426/37, 38, 89, 580, 582

[56] References Cited

U.S. PATENT DOCUMENTS

| | | | |
|---|---|---|---|
| 4,568,548 | 2/1986 | Sprenger | 426/36 |
| 4,911,935 | 3/1990 | Fillaud et al. | 426/36 |

OTHER PUBLICATIONS

87:16342 FSIA DN 87-11-P0099, Kornacki et al., Przemysl Spozywczy, (1985) 39 (11/12) 386-388, abstract only.

*Primary Examiner*—Leslie Wong
*Attorney, Agent, or Firm*—Thomas A. Marcoux; Linn I. Grim; Thomas R. Savoie

[57] ABSTRACT

The invention provides a surface-ripened cheese product prepared from a natural cheese base, and having extended shelf life; the natural cheese base is preferably selected from English types, eyed types, Italian types, Danish types, and reduced fat or lower fat varieties of any of same. A surface-ripening culture, preferably *Penicillium candidum* or *Penicillium camemberti*, is appli to the outside surface of a natural cheese base, and incubated under controlled conditions.

9 Claims, No Drawings

SURFACE-RIPENED CHEESE PRODUCT

This invention relates to a surface-ripened cheese product, and to methods for production of same. In particular, the invention relates to a surface-ripened cheese product produced from a stable natural cheese base.

BACKGROUND OF THE INVENTION

Surface-ripened cheese products are of considerable economic importance, and command a significant and increasing share of the natural cheese market.

Traditionally, the surface-ripening culture plays an important role in the maturation and development of the cheese. The culture also contributes to the rapid breakdown and short shelf life of these cheeses.

German Utility Model (Gebrauchsmuster) No. 8433396 describes a block of processed cheese or processed cheese product, which is coated with a surface layer of Camembert or Roquefort mould in order to provide a harder rind, and thus enhance shape and storage stability. In a preferred embodiment, layers of a natural cheese such as a blue vein cheese or a second processed cheese or processed cheese product are incorporated into the processed cheese block. However, the product described in the specification is not what would normally be referred to as a surface-ripened cheese, as there is no modification of flavour or texture of the starting processed cheese material.

U.S. Pat. No. 4,911,935 by Bongrain S. A. describes a food product Comprising a mass of cheese having a semi-permeable external envelope covering its exterior surface, on which a surface mould may be grown to improve maturation of the cheese without rapid degradation. The semi-permeable layer is a food gel, preferably carrageenan, an alginate, gelatin, food protein, or a mixture thereof.

European Patent No. 33635 by C.P.C. International Inc. describes a packaged cheese spread based on a natural cheese, in which the natural cheese is combined with an edible fat and a stabilising agent, heated, mixed and poured into containers, and then coated with an edible barrier material which forms an impermeable film over the cheese spread surface, and then inoculated with *Penicillium camemberti* to form a camembert-type crust.

Czechoslovak Patent No. 249009 describes a process of manufacturing a surface-ripened cheese in which the surface of a naturally ripening cheese, of unspecified origin, is pasteurised in a saline solution at 75° to 90° C. and then inoculated with a culture of lactic fermentation bacteria together with a culture of *Penicillium camemberti*, in order to form a surface layer which prevents the growth of undesirable microorganisms, thus avoiding the need fro the cheese surface to be scraped or washed before marketing. It appears that this product may not undergo any maturation of flavour.

However, most surface-ripened cheeses on the market are of the Camembert, Brie, or Chevre types, prepared using traditional methods.

The shelf life of most such surface-ripened cheeses is in the range of 6 to 10 weeks. So far, the only practicable way in which this shelf life can be extended has been by canning the cheese, which results in a product with reduced consumer appeal.

We have now found it possible to produce a surface-ripened product which has an improved shelf life (greater than 20 weeks, and usually 25 to 30 weeks) and which does not suffer any loss in consumer appeal over this extended shelf life, without the need to employ an impermeable or permeable external layer, or to use an additional culture inoculum following a pasteurisation step.

We have surpisingly found that by using a stable natural cheese as a starting product, applying a surface-ripening culture to the outside surface of the cheese, and incubating under carefully controlled conditions, the resulting product has considerably extended shelf life. By using an existing stable cheese as substrate for the surface-ripening culture a stable base is provided, which resists breakdown by the surface-ripening culture:

SUMMARY OF THE INVENTION

According to one aspect of the present invention, there is provided a surface-ripened cheese product prepared from a stable natural cheese base, and having extended shelf life.

According to a second aspect of the invention, there is provided a method of making a surface-ripened cheese product, comprising the step of applying a surface-ripening culture to the outside surface of a stable natural cheese base, and incubating under controlled conditions.

Suitable surface-ripening cultures are of the type generally described as being of the 'white mould' type, but are not necessarily white. They will grow substantially only on the exposed surface of the natural cheese base, and will not break down the body of the cheese. They will, of course, be non-toxic, and be able to produce an organoleptically desirable product. The culture must be able to grow in the pH range of the natural cheese base, which is generally but not necessarily about pH 4.9 to about pH 5.4.

Most of the surface-ripening cultures which are presently widely used in the art grow optimally at 8° to 18° C., and at relative humidity 90% to 100%, but these are not specific requirements for cultures suitable for use in this invention.

Preferably, the surface-ripening culture is *Penicillium candidum* or *Penicillium camemberti*, but other suitable mould varieties can be used, and are known to those skilled in the art.

The culture conditions are not critical, except insofar as they must support the growth of the surface-ripening culture.

Preferably the temperature of incubation is between 8° and 18° C., more preferably 10° C.

Preferably the humidity during incubation is 90 to 100%, more preferably 95 to 100%.

Preferably the natural cheese base is selected from the group consisting of normal, reduced fat or lower fat:

Eyed types, such as Edam and Swiss

Italian types, such as Mozzarella

Danish types, such as Havarti and other similar varieties, as well as reduced fat or lower fat varieties of any of these.

The cheese must be of a type which is inherently stable both chemically and microbiologically, ie. susceptible only to limited surface growth of the ripening culture, so that the ripening culture cannot significantly penetrate the body of the cheese, and affects substantially only the surface of the cheese. It must be able to produce an organoleptically desirable product, and must not contain added preservative which would prevent growth of the surface-ripening culture. Suitable cheese types will generally, but not exclusively, be products which are freshly made and are not susceptible to rapid attack and breakdown by surface-ripening cultures.

The natural cheese base may be in any desired shape or thickness, since the surface-ripening culture does not have to penetrate the whole product, in contrast to convention surface-ripened cheese of the Brie or Camembert type.

DETAILED DESCRIPTION OF THE INVENTION

The natural cheese base is prepared by technology appropriate for the variety under consideration, and is then cut to the shape required for the surface-ripened product.

The cheese is then inoculated with a suspension of the surface-ripening culture, preferably by spraying, and is incubated under conditions of control temperature and humidity until good mould growth has been achieved. The cheese may be turned and culture suspension reapplied in order to ensure even coverage of mould.

When good mould growth has been achieved, the finished product may be packed in a suitable wrapping material, for example paper-lined perforated plastic film, such as is typically used for surface-ripened cheese.

Although the surface-ripening culture is preferably applied by spraying, other coating methods such as dipping may alternatively be used.

The cheese product will remain in good condition for more than 20 weeks, preferably 25 to 30 weeks, under appropriate refrigerated storage, typically at 2° C. to 5° C.

The invention will be further illustrated by way of reference only to the following non-limiting examples.

Example 1 Cheddar-Based Surface-Ripened Cheese

The surface-ripened product was made from Cheddar cheese in accordance with the following steps:

1. Cheddar cheese of 2 to 4 weeks of age was selected, ensuring that no flavour defects were present;
2. The Cheddar cheese was cut to the shape and size desired for the finished product;
3. The cheese was sprayed with a suspension of *Penicillium candidum*, and stored on racks in a controlled atmosphere maturing room. The temperature was between 8° and 18° C., typically 10° C. The humidity was between 95 and 100%;
4. After 2 days of incubation, the cheese was turned, and re-sprayed with culture. This step may optionally be repeated after another 2 days;
5. When good even mould coverage had been achieved, typically by 7 to 14 days, the cheese was removed from the maturing room, wrapped and placed in cartons, and placed in refrigerated storage at 2° C. to 5° C. Under these conditions, the cheese was found to have a shelf life of 25 to 30 weeks.

A surface-ripened cheese product made from Cheddar cheese using the method described above had the following typical composition:

| Product | Amount |
| --- | --- |
| Water | 37.0% |
| Fat | 33.0% |
| Protein | 26.0% |
| Salt | 1.8% |
| Lactose | trace |
| Ash | 3.5% |
| Sodium | 9800 ppm |
| Potassium | 1000 ppm |
| Calcium | 7400 ppm |
| Phosphorus | 5300 ppm |

Example 2 Colby-Based Surface-Ripened Cheese

The surface-ripened product was made from Colby cheese in accordance with the following steps:

1. Colby cheese was selected at 2–4 weeks of age, ensuring that no flavour defects were present;
2. The Colby cheese was cut to the shape and size desired for the finished product;
3. The cheese was sprayed with a suspension of *Penicillium camemberti*, and stored on racks in a controlled atmosphere maturing room. The temperature was between 8° and 18° C., typically 10° C., and the humidity was between 95% and 100%;
4. After 2 days of incubation, the cheese was turned, and re-sprayed with culture. This step may optionally be repeated after another 2 days;
5. When good even mould coverage had been achieved, typically by 7 to 14 days, the cheese was removed from the maturing room, wrapped and placed in cartons, and placed in refrigerated storage at 2° to 5° C. Under these conditions, the cheese was found to have a shelf life of 25 to 30 weeks.

A surface-ripened cheese product made from Colby cheese using the method described in Example 2 had the following typical composition:

| Product | Amount |
| --- | --- |
| Water | 38.0% |
| Fat | 34.0% |
| Salt | 1.8% |
| pH | 5.1% |
| Protein | 23.0% |
| Lactose | trace |
| Ash | 3.5% |
| Sodium | 9800 ppm |
| Potassium | 1000 ppm |
| Calcium | 7400 ppm |
| Phosphorus | 5300 ppm |

Example 3 Edam-Based Surface-Ripened Cheese

The surface-ripened product was made from Edam cheese in accordance with the following steps:

1. Edam cheese of 2 to 4 weeks of age was selected, ensuring that no compositional or flavour defects were present;
2. The Edam cheese was cut to the shape and size desired for the finished product;
3. The cheese was sprayed with a suspension of Penicillium candidum, and stored on racks in a controlled atmosphere maturing room. The temperature was between 8° C. and 18° C., typically 10° C., and the humidity was between 95 and 100%;
4. After 2 days of incubation, the cheese was turned and re-sprayed with culture. This step may optionally be repeated after another 2 days;
5. When good even mould coverage had been achieved, typically by 7 to 14 days, the cheese was removed from the maturing room, wrapped and placed in cartons, and placed in refrigerated storage at 2° to 5° C. Under these conditions, the cheese was found to have a shelf life of 25 to 30 weeks.

A surface-ripened cheese product made from Edam cheese using the method of Example 3 had the following typical composition:

| Product | Amount |
| --- | --- |
| Water | 39.0% |
| Fat | 25.0% |
| Salt | 1.9% |
| pH | 5.1% |
| Protein | 26.0% |
| Lactose | trace |
| Ash | 3.5% |
| Sodium | 10100 ppm |
| Potassium | 1500 ppm |
| Calcium | 8700 ppm |
| Phosphorus | 7600 ppm |

The products of Examples 1, 2 and 3 have a fluffy white exterior surface, stay firm, and have a pleasant mild cheese flavour, with a distinctive "camembert" note.

It will be clearly understood that the invention in its general aspects is not limited to the specific details referred to hereinabove.

I claim:

1. A surface-ripened cheese product having a shelf life of at least 20 weeks at 2° C. to 5° C., prepared from a stable natural cheese base wherein a surface-ripening culture selected from the group consisting of *Penicillium candidum* and *Penicillium camemberti* is applied to the outside surface of said stable natural cheese base.

2. A surface-ripened cheese product according to claim 1, in which the natural cheese base is selected from the group consisting of fat English types, eyed types, Italian types, and Danish types.

3. A surface-ripened cheese product according to claim 1, in which the natural cheese base is selected from the group consisting of Cheddar, Colby, Cheshire, Edam, Swiss, Mozzarella and Havarti.

4. A method of making a surface-ripened cheese product having a shelf life of at least 20 weeks at 2° C. to 5° C., comprising the step of applying a surface-ripening culture selected from the group consisting of *Penicillium candidum* and *Penicillium camemberti* to the outside surface of a stable natural cheese base, and incubating under controlled conditions.

5. A method of making a surface-ripened cheese product according to claim 4, wherein the flavour and/or texture of the natural cheese base is modified to produce the surface-ripened cheese, and wherein the stable natural cheese base is not significantly penetrated by the surface-ripening culture.

6. A method according to claim 4 in which the natural cheese base is selected from the group consisting of fat English types, eyed types, Italian types and Danish types.

7. A method according to claim 4 in which the natural cheese base is selected from the group consisting of Cheddar, Colby, Cheshire, Edam, Swiss, Mozzarella and Havarti.

8. A method of making a surface-ripened cheese product according to claim 4 comprising the steps of:
   (a) applying the surface-ripening culture by spraying;
   (b) incubating at a temperature of 8° C. to 18° C. at a humidity of 95° C. to 100%, for 7 to 14 days; and
   (c) storing at 2° C. to 5° C.

9. A method according to claim 4 in which the surface-ripening culture is applied by spraying one or more times during incubation.

* * * * *